United States Patent [19]
Hsu et al.

[11] Patent Number: 5,526,504
[45] Date of Patent: Jun. 11, 1996

[54] VARIABLE PAGE SIZE TRANSLATION LOOKASIDE BUFFER

[75] Inventors: Peter Y. Hsu, Fremont; Joseph T. Scanlon, Sunnyvale, both of Calif.; Steve J. Ciavaglia, Williston, Vt.

[73] Assignee: Silicon Graphics, Inc., Mountain View, Calif.

[21] Appl. No.: 168,822

[22] Filed: Dec. 15, 1993

[51] Int. Cl.$^6$ .................................................. G06F 12/10
[52] U.S. Cl. .......................................... 395/417; 395/419
[58] Field of Search ................................ 395/400, 425, 395/416, 417, 418, 419; 365/49

[56] References Cited

U.S. PATENT DOCUMENTS

| | | | |
|---|---|---|---|
| 3,675,215 | 7/1972 | Arnold et al. | 395/497.02 |
| 4,622,653 | 11/1986 | McElroy | 365/49 |
| 4,852,059 | 7/1989 | Oates | 365/49 |
| 4,903,234 | 2/1990 | Sukuraba et al. | 365/49 |
| 5,058,003 | 10/1991 | White | 395/419 |
| 5,133,058 | 7/1992 | Jensen | 395/417 |
| 5,263,140 | 11/1993 | Riordan | 395/417 |
| 5,375,214 | 12/1994 | Mifza et al. | 395/417 |

OTHER PUBLICATIONS

David A. Patterson et al., "Computer Architecture: A Quantitative Approach", Morgan Kaufmann Publishers, Inc., San Mateo CA pp. 489–507.
Hot Chips IV Symposium, Stanford University, Aug. 9–11, 1992, Message from the Program Chairs, Message from the General Chair, Sunday tutorial schedule, Monday schedule, Tuesday schedule, and pp. 1.2.1–1.2.13.
Hot Chips V Symposium, Stanford University, Aug. 8–10, 1993, Message from the General Chair, Message from the Program Co–Chairs, Sunday tutorial schedule, Monday schedule, Tuesday schedule, and pp. 8.1.1–8.1.9.
Hot Chips V Symposium, Stanford University, Aug. 8–10, 1993, Message from the General Chair, Message from the Program Co–Chairs, Sunday tutorial schedule, Monday schedule, Tuesday schedule, and pp. 1.3.1–1.3.12.
Case, B. (1992) "IBM Delivers First PowerPC Microprocessor" *Microprocessor Report The Insider's Guide to Microprocessor Hardware* vol. 6, No. 14, pp. 5–10.
Case, B. (1993) "Intel Reveals Pentium Implementation Details" *Microprocessor Report* pp. 9–17.
Case, B., et al. (1992) "DEC Enters Microprocessor Business with Alpha" *Microprocessor Report The Insider's Guide to Microprocessor Hardware* vol. 6, No. 3, pp. 5–14.
Slater, M. (1991) "Second–Generation i860 Premiers as i860XP" *Microprocessor Report The Insider's Guide to Microprocessor Hardware* vol. 5, No. 11, pp. 5–9.

*Primary Examiner*—Jack A. Lane
*Attorney, Agent, or Firm*—Sterne, Kessler, Goldstein & Fox

[57] ABSTRACT

A set associative translation lookaside buffer (TLB) that supports variable sized pages without requiring the use of a separate block TLB. The TLB includes a hashing circuit that creates an index into the TLB for a virtual address using different bits from the virtual address depending on the page size of the address, and a comparator that compares virtual address identifiers or portions of virtual address identifiers stored in the TLB to the current virtual address to determine if a translation to the current virtual address is stored in the TLB.

8 Claims, 6 Drawing Sheets

VARIABLE PAGE SIZE TRANSLATION LOOKASIDE BUFFER

The present invention relates generally to a translation lookaside buffer. More specifically, the present invention relates to a set-associative translation lookaside buffer that provides virtual address to physical address mappings of variable sized physical pages.

BACKGROUND OF THE INVENTION

Modern computers use a virtual addressing scheme which allows the computer to address an address space larger than its internal memory. Before memory can be accessed in such a scheme, however, each virtual address must be translated to a physical address. Unfortunately, the translation process ordinarily requires multiple accesses to page and segment tables in the computer's memory, which significantly degrades the computer's performance.

To overcome this problem, a translation lookaside buffer (TLB) is used to maintain the most recently used virtual address to physical address mappings. Each TLB entry ordinarily contains a virtual address, a physical address mapped to the virtual address, and control information such as access protection and validity flags. Before translating an input virtual address in the conventional manner, the TLB is searched to see if a physical address mapping for the virtual address is present. If a physical address mapping is present in the TLB, the physical address may be obtained directly from the TLB, thus avoiding the time-wasting translation process.

TLBs can be classified into one of three different categories depending on how they store and search for virtual addresses: direct mapped, set associative, or fully associative. A direct mapped TLB maps each virtual address to a specific location in the TLB. Since there are more virtual addresses than entries in the TLB, a subset of bits of each virtual address is used to hash the virtual address to a TLB entry. Thus, each TLB entry is mapped to by more than one virtual page.

Directly mapping a TLB is the simplest and quickest method of implementing a TLB. However, when memory references to different virtual pages are accessed alternately in run time and are mapped to the same TLB location, each reference causes a TLB miss which causes the TLB to replace the entry just replaced. Since TLB misses occur regularly in a case such as this, the TLB can slow down execution of a program more than it speeds it up causing what is often referred to as thrashing.

A set associative TLB can be looked at as two or more TLBs connected in parallel with each other. Each virtual memory location corresponds to a particular line in each parallel TLB. Thus, each virtual memory location maps to more than one location in a set associative TLB, and a particular location in the TLB holds a number of virtual address mappings equal to the number of "sets" of the TLB, i.e., a four-way set associative TLB holds four virtual address to physical address mappings in each TLB address location. For a set associative TLB, the entry chosen as a replacement in instances of a TLB miss can be a function of the last entry used that is mapped to the particular address in the parallel TLBs. Set associative TLBs greatly reduce the likelihood of thrashing.

A fully associative TLB uses a content addressable memory to store virtual addresses and simultaneously compares an input virtual address to each stored virtual address. Fully associative TLBs are least likely to be effected by thrashing, however, content addressable memories are slower and take up more chip real estate for a given sized TLB than either direct mapped or set associative TLBs.

There is a large market for high-performance computers that run various types of applications efficiently. These applications can vary from super-computing scale problems, which process large amounts of data, to simpler, more ordinary applications that are not data intensive.

Applications that work with large data sets, referred to as high-end applications, consume large amounts of virtual and physical memory. If memory is divided into small pages (such as 4K byte pages), these applications require many pages and a corresponding entry for each page in the TLB. Often the number of pages required by a high-end application exceeds the number of entries in the TLB. This leads to inefficient computer operation and poor performance. Thus, for high-end applications, it is advantageous to divide memory into larger page sizes.

For other applications, which are not data intensive, however, a large page size results in inefficient operation and poor performance. For example, for a program only requiring 4K bytes of memory, a large amount of memory will be wasted if the memory is divided into 1M byte pages. Thus, for some applications, computer resources can be allocated more efficiently with a small page size. Accordingly, it is advantageous to have a TLB that can support multiple page sizes, allowing certain high-end applications to work with large pages and other applications to work with smaller pages.

Several computer manufacturers have developed prior art TLBs that support multiple page sizes. However, all of these designs incorporate either fully associative TLBs that are larger and slower for a given size than set associative TLBs, or use two separate TLBs—a main TLB for a standard sized pages and a second, block TLB for larger sized pages.

SUMMARY OF THE INVENTION

The present invention solves the problems of the prior art by providing a set associative TLB that supports variable-sized pages without necessitating the use of a separate block TLB.

In one embodiment of a TLB according to the present invention, a memory stores pairs of corresponding virtual address and physical address mappings; an index selection circuit selects bits of a virtual address according to a process' page size which are used to create an index to a specific location in the memory; a hashing circuit creates the index into the memory by hashing the selected bits with a process identifier; a comparing means reads out the virtual tag stored at the indexed TLB address and compares specific bits, determined by a process' page size, of a stored virtual address identifier with corresponding specific bits of the current virtual address being translated; and an output means outputs the address of the physical page if the stored virtual tag matches the current virtual page address.

The features and advantages of a translation lookaside buffer according to the present invention will be more clearly understood from the following description taken in conjunction with the accompanying drawings.

DESCRIPTION OF THE PREFERRED EMBODIMENT

Table of Contents

CONSTRUCTION OF TRANSLATION LOOKASIDE BUFFER 100

A. Random Access Memory 104

Composition of Entries in Ram 104

C. Page Sizes Supported by TLB 100

D. Hashing Circuit 108

E. Page Address Output Circuit 112

II. PERFORMING VIRTUAL ADDRESS TRANSLATIONS

A. Addressing Translation Lookaside Buffer 100

B. Comparing the Virtual Tags

C. Outputting the Physical Page Address

III. WRITING AND READING TRANSLATION LOOKASIDE BUFFER 100

A. TLB Write Operations

B. TLB Read Operations

I. CONSTRUCTION OF TRANSLATION LOOKASIDE BUFFER 100

Figure 1:
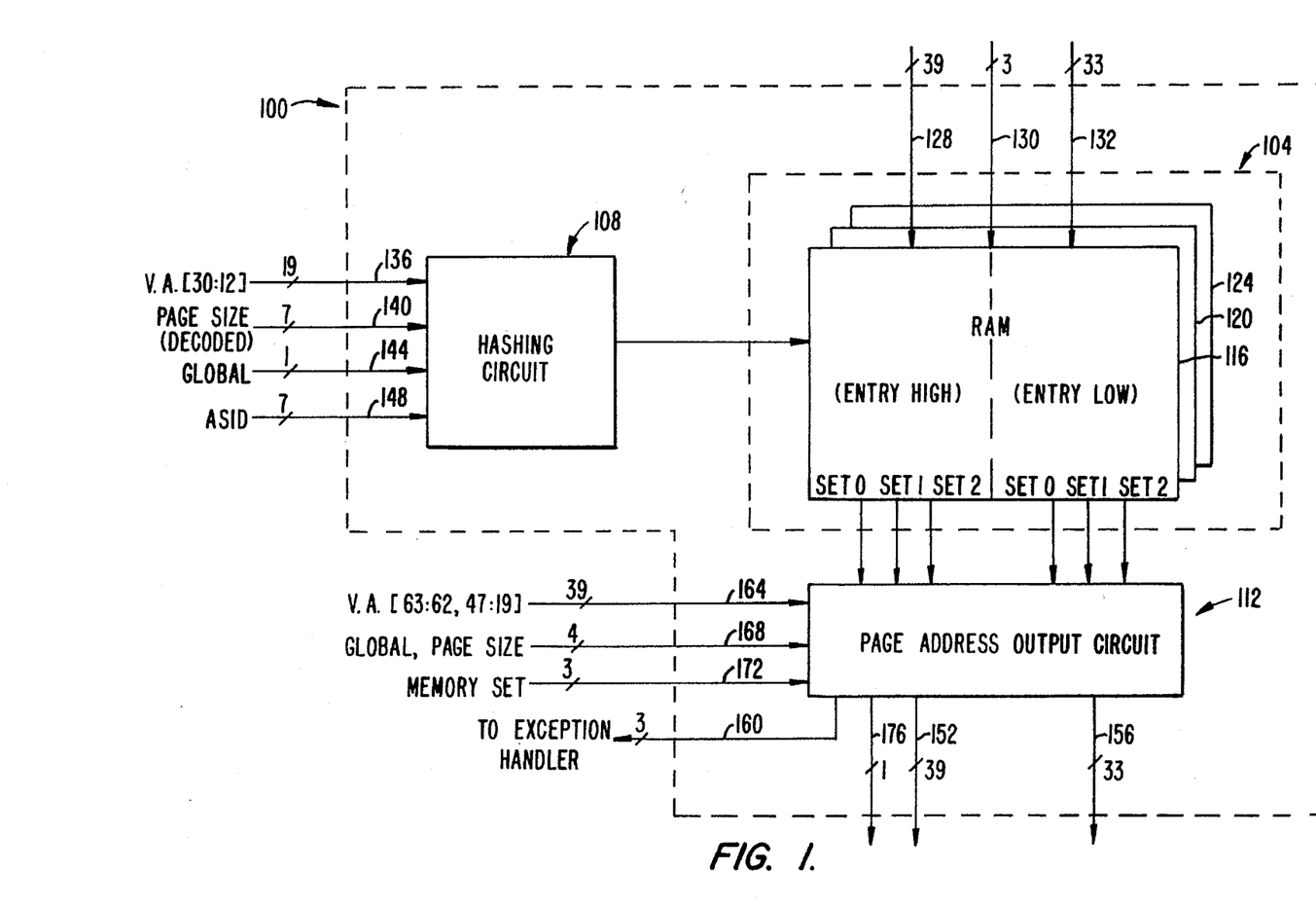
FIG. 1 is a block diagram showing one embodiment of a set associative translation lookaside buffer according to the present invention.

FIG. 1 is a block diagram showing one embodiment of a set associative translation lookaside buffer (TLB) 100 according to the present invention. TLB 100 includes a random access memory (RAM) 104 for storing virtual page address and physical page address pairs, a hashing circuit 108 for hashing virtual addresses to locations in RAM 104, and a page address output circuit 112 for outputting physical address translations of virtual addresses.

A. RANDOM ACCESS MEMORY 104

RAM 104 is a three-way set associative memory that includes memory sets 116, 120, and 124. Each memory set 116, 120, and 124 stores 128 virtual page address translations (or 128 TLB entries) so the total memory capacity of RAM 104 is 384 entries. Memory sets of 128 entries require a 7-bit address to address each individual entry. Thus, RAM 104 uses a 7-bit index to store and locate entries.

RAM 104 receives input virtual to physical address mappings over communication paths 128 and 132, respectively. To control which memory set 116, 120, or 124 entries are written to, a 3-bit write enable signal is input to TLB 100 over a communication path 130. RAM 104 outputs virtual and physical page addresses through page address output circuit 112 over communication paths 152 and 156.

Each memory set 116, 120, and 124 in RAM 104 is divided into a high portion and a low portion. Virtual addresses are stored in the high portion, while physical addresses are stored in the low portion. The high portion and low portion of RAM 104 are implemented in physically separate memories; whereas, memory sets 116, 120, and 124 are not physically separate in either the high or low portion of RAM 104.

B. COMPOSITION OF ENTRIES IN RAM 104

Figure 2A:
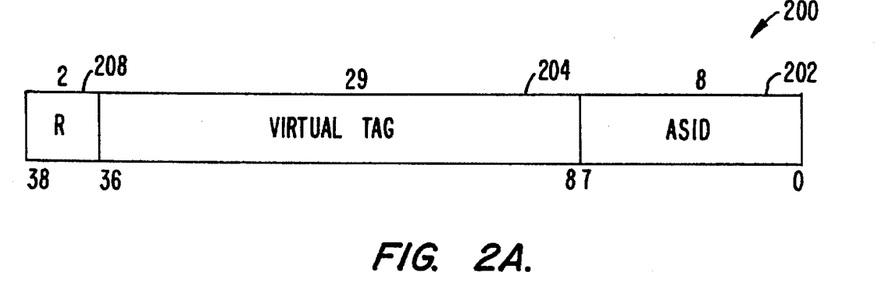
FIGS. 2(a) and (b) are diagrams of entries for the high and low portions, respectively, for one embodiment of the random access memory shown in FIG. 1.

As shown in FIG. 2a, each virtual address identifier 200 in the high portion of memory sets 116, 120, and 124 includes an 8-bit application specific identifier (ASID) 202, a virtual tag 204, and region bits 208. ASID 202 is a unique identifier that identifies which application or executing process virtual address identifier 200 belongs to. Thus, TLB 100 can store virtual and physical address mappings for different processes and applications that are simultaneously executing on a processor.

The minimum page size supported by TLB 100 is 4K bytes, which requires a 12-bit offset ($2^{12} = 4096$). Virtual tag 204 is a unique identifier that identifies each virtual page. To uniquely identify each virtual page, virtual tag 204 includes the upper bits of a virtual address, but does not need to include the offset into a physical page or the index bits which are unique to each TLB entry. Thus, for a 48 bit virtual address, virtual tag 204 is 29 bits (48-bit virtual address - 12-bit minimum offset - 7-bit index). Region bits 208 are used to specify which address space (user, kernel private, or kernel global) a TLB translation is valid for.

Figure 2B:
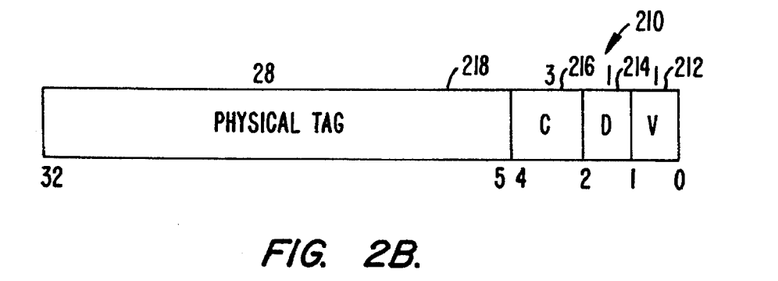

As shown in FIG. 2b, each physical page address identifier 210 in the low portion of memory sets 116, 120, and 124 includes a valid bit 212, a dirty bit 214, a 3-bit cache algorithm entry 216, and a physical tag 218. Valid bit 212 indicates whether a virtual address to physical address translation is valid. For example, when a processor is turned on, there are no virtual address translations stored in TLB 100 - only random bit sequences. An initialization routine stored in the processor's ROM sets all entries in TLB 100 to invalid, and only as actual virtual address translations are stored into TLB 100 are entries marked valid by setting valid bit 212.

Dirty bit 214 is used to indicate if data has been written to a page. When a page is first mapped in TLB 100, its dirty bit 214 is set to (0). If a store is attempted to a virtual address that matches a valid TLB entry that has dirty bit 214 set to (0), which indicates the page has not been written to, TLB 100 generates an exception to update dirty bit 214 changing it to (1). This indicates to the processor that the page has been written to and must be written back to memory at a later time. Cache algorithm bits 216 allow for one of eight different cache algorithms to be used for each physical page entry. The inclusion of different cache algorithms allows a multiprocessor to operate more efficiently by handling different pages in physical memory differently.

C. PAGE SIZES SUPPORTED BY TLB 100

Since TLB 100 is set associative, a portion of the virtual address is used to index each entry into RAM 104 of TLB 100. As discussed above, having 128 entries in each memory set 116, 120, and 124, requires an index of 7 bits. However, since TLB 100 supports variable pages sizes, the actual bits used to index each entry into TLB 100 varies along with the page size. Which 7 bits are used to index into TLB 100 depends on the page size of each application or process.

FIGS. 3(a)–(g) show virtual address fields 300 for page sizes of 4K, 8K, 16K, 64K, 1M, 4M, and 16M bytes, respectively, which are supported by TLB 100. Each virtual address field 300 includes an offset field 302, an index field 304, a virtual tag field 306, a region field 308, and an area of unused bits 310.

The size of offset field 302 varies with page size. A 4K page has an offset field of 12 bits, an 8K page receives an offset field of 13 bits, a 16K page has an offset field of 14 bits, a 64K page has an offset field of 16 bits, a 1M page requires an offset field of 20 bits, a 4M page has an offset field of 22 bits, and a 16M page has an offset field of 24 bits. Index field 304, which is used to locate a virtual address into TLB 7, is always 7 bits. However, because offset field 302 varies with page size, the bits that make up index field 304 vary. As can be seen in FIGS. 3(a)–(g), bits 12 to 18 are used to index a 4K page; bits 13 to 19 are used for an 8K page; bits 14 to 20 are used for a 16K page; bits 16 to 22 are used for a 64K page; bits 20 to 26 are used for a 1M page; bits 22 to 28 are used for a 4M page; and bits 24 to 30 are used for a 16M page. Thus, depending on the page size, the bits used to index a virtual address into RAM 104 include some sequentially ordered subset of bits 12 to 30.

Since the size of the offset into a page varies with page size, the size of the virtual tag also varies. When using 48 bit virtual addresses and a 7-bit index into TLB 100, the virtual tag for a 4K page is 29 bits, for an 8K page it is 28 bits, for a 16K page it is 27 bits, for a 64K page it is 25 bits, for a 1M page it is 21 bits, for a 4M page it is 19 bits, and for a 16M page it is 17 bits.

Region field 308 indicates what type of address space each virtual address 300 belongs to. In the preferred embodiment, there are four types of address spaces: user, kernel private, kernel global, and unmapped. When the bits in region field 308 for a given virtual address are set to (00), the given virtual address is for a specific user address space. Which user address space is indicated by the ASID, which is unique to each process and is stored in a register. When region field 308 is set to (01), the given virtual address is a private kernel address that is related to a specific user or process, and thus must be compared to the ASID to obtain privileges. When region field 308 is set to (10) it is an unmapped address, which has a physical address equal to the lower 40-bits of the virtual address, and thus, does not use TLB 100 at all. Finally, when region field 308 is (11) it is a global kernel address and can ignore the ASID for entries in TLB 100 because, e.g., the kernel could be performing upkeep operations for all users or processes.

D. HASHING CIRCUIT 108

Hashing circuit 108 receives a selected portion of a virtual address to be translated over a communication path 136, receives information on a process' page size over a communication path 140, receives a control signal indicating if the address is for the global address space over communication path 144 and receives the ASID over a communication path 148.

Figure 4:
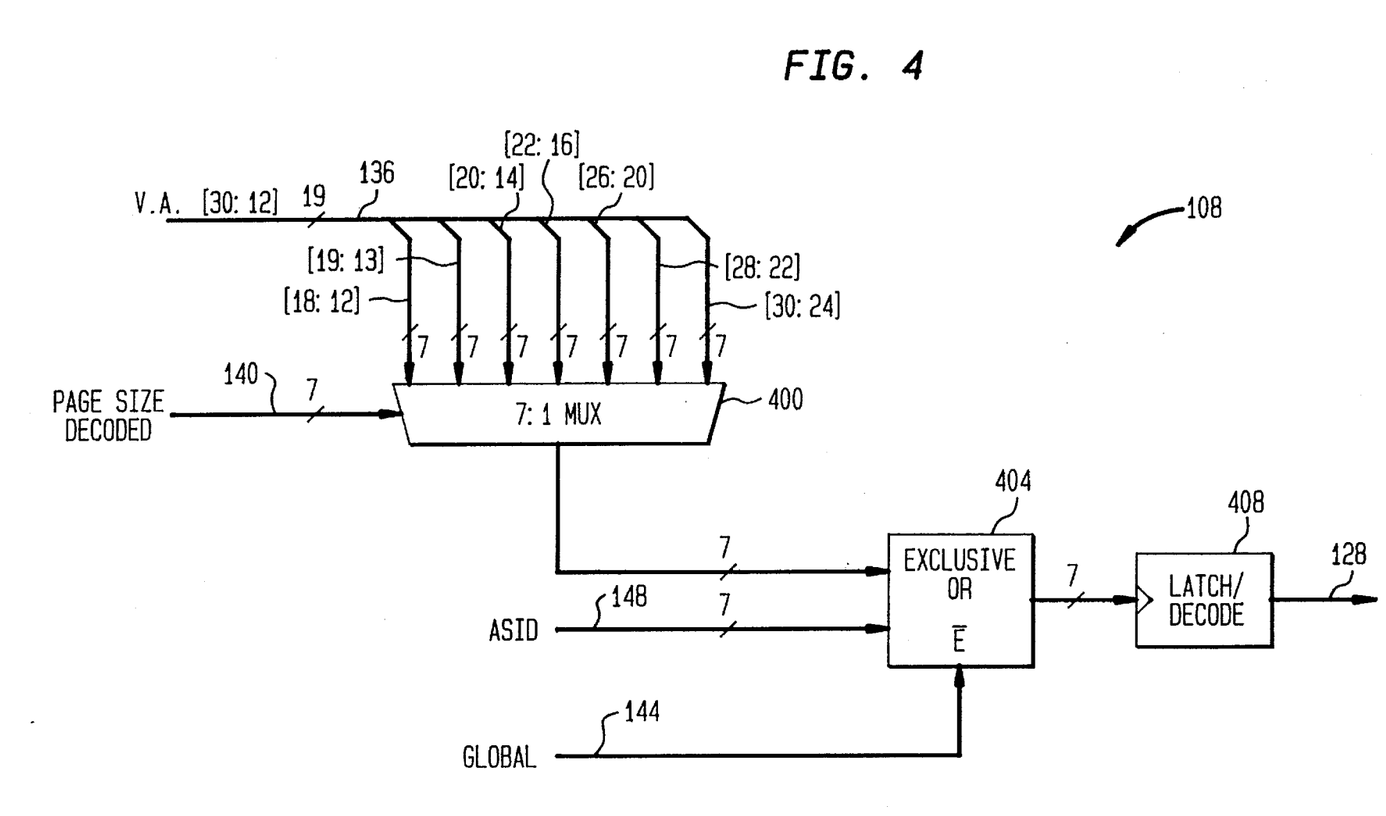
FIG. 4 is a block diagram of one embodiment of the hashing circuit shown in FIG. 1.

FIG. 4 is a block diagram of one embodiment of hashing circuit 108 shown in FIG. 1. For convenience, the same reference numerals used in FIGS. 1–3 are used in FIG. 4 to refer to like elements. Hashing circuit 108 includes a multiplexer 400 for selecting bits to use in creating an index to RAM 104 from bits 12 to 30 of a current virtual address received over communication path 136, a hashing means 404 for combining the index received from multiplexer 400 with the ASID received over communication path 148, and a latch/decoder 408 for latching the output of hashing means 404 and addressing a particular location in each memory set 116, 120, and 124.

Multiplexer 400 is a 7-bit wide, seven-to-one multiplexer. Thus, multiplexer 400 selects one of seven sets of bits to create an index into TLB 100 depending on the page size of the currently executing process. Each set of seven bits corresponds to index field 304 of a virtual address.

Hashing means 404 is a two-input exclusive-OR circuit with each input being seven bits wide. Hashing means 404 gates the seven bits selected from multiplexer 400 with the seven bits of the ASID received over communication path 148 in a bit-wise exclusive-OR operation unless the global bit received over communication path 144 indicates the virtual address is in the kernel address space. Since the global bit is coupled to an enable input of exclusive-DR 404, if the virtual address is in the kernel address space, hashing means 404 is disabled and the index into TLB 100 is simply the output from multiplexer 400.

E. PAGE ADDRESS OUTPUT CIRCUIT 112

Page address output circuit 112 outputs virtual and physical page addresses over communication paths 152 and 156, respectively, and outputs a match signal over a communication path 160. Page address output circuit 112 receives the virtual addresses to be translated over a communication path 164, receives a global and page size signal over a communication path 168, receives a memory set select signal over a communication path 172, and receives a control signal over a communication path 176.

Figure 5:
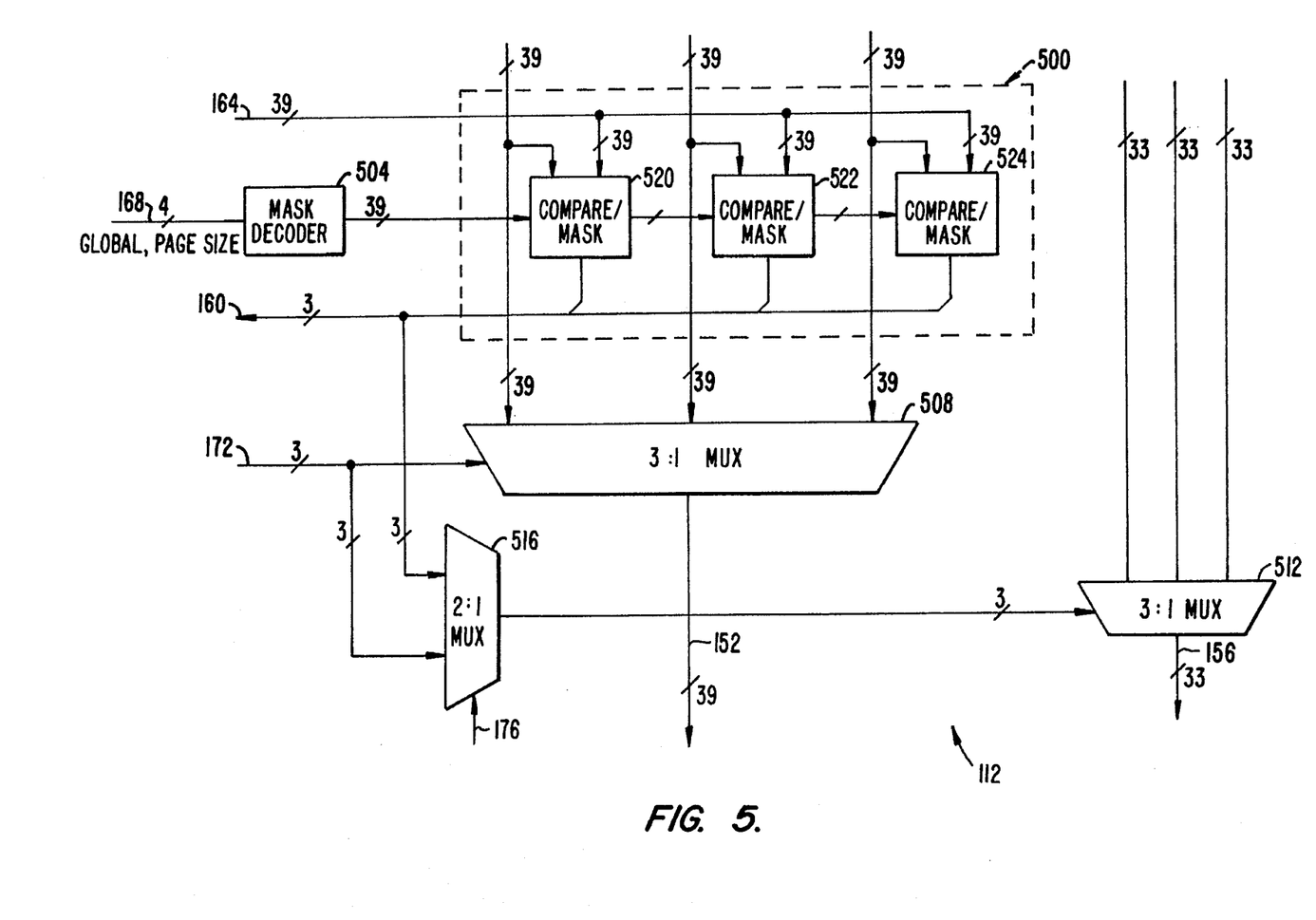
FIG. 5 is a block diagram of one embodiment of the page address output circuit shown in FIG. 1.

FIG. 5 is a block diagram of one embodiment of page address output circuit 112 shown in FIG. 1. For convenience, the same reference numerals used in FIGS. 1–3 are used in FIG. 5 to refer to like elements. Page address output circuit 112 includes a compare and mask circuit 500 for comparing the virtual tags stored in and output from each memory set 116, 120, and 124 of RAM 104 with selected bits from the virtual address to be translated; a mask decoder 504 for creating from a 4-bit global and page size signal received over communication path 168 from a register not shown, a 39-bit mask, that controls which bit comparisons from compare and mask circuit 500 are masked; a multiplexer 508 that selects, in response to the memory set select signal received over communication path 172 for a read operation, which one of memory sets 116, 120, or 124 the stored virtual address is output from; a multiplexer 512 that selects, in response to a control signal received from multiplexer 516, which one of the memory sets 116, 120, or 124 the physical page address is output from. Additionally, multiplexer 516 receives the control signal over communication path 176, and page address output circuit 112 outputs a TLB miss signal over communication path 160 to an exception handler which is not shown.

Compare and mask circuit 500 includes three separate compare/mask circuits 520, 522, and 524, one for each memory set 116, 120, and 124. Each separate compare/mask circuit 520, 522, and 524 compares the virtual page identifier read out from its respective memory set to the virtual address being translated. Compare/mask circuit 520 is coupled to memory set 116, compare/mask circuit 552 is coupled to memory set 120, and compare/mask circuit 524 is coupled to memory set 124. Multiplexer 508 is a 39-bit wide three-to-one multiplexer, multiplexer 512 is a 33-bit wide three-to-one multiplexer, and multiplexer 516 is a 3-bit wide two-to-one multiplexer.

II. PERFORMING VIRTUAL ADDRESS TRANSLATIONS

The primary function of TLB 100 is to determine the physical page to which a virtual address is mapped, i.e., to translate virtual addresses into physical addresses. In a virtual addressing scheme, every time a processor makes a reference to a memory location, the virtual address of the memory reference needs to be translated to a physical address. For every virtual address translation, TLB 100 is searched to determine if the translation is stored in RAM 104, which thus allows the processor to avoid looking up the translation in its page tables.

There are three basic steps in performing virtual address translations for set associative TLB 100. First, an address in RAM 104 is calculated by hashing circuit 108 for the virtual address being translated. Second, the virtual address identifiers stored at the calculated address for each memory set 116, 120, and 124 in RAM 104 are read out and compared to the virtual address being translated. And finally, if one of the stored virtual address identifiers matches the virtual address being translated, the physical page address identifier is output from RAM 104.

A. ADDRESSING TRANSLATION LOOKASIDE BUFFER 100

Since TLB 100 is a set associative TLB, a translation for a particular virtual address can only be stored in RAM 104 at the location accessed by the address generated by hashing circuit 108 for the current virtual address.

Referring back to FIGS. 1 and 4, hashing circuit 108 creates a hash address for the virtual address to be translated (referred to as the current virtual address) so that the entries stored in RAM 104 at the hash address can be examined to determine if they contain the correct translation for the current virtual address. The hash address calculated by hashing circuit 108 for the current virtual address depends on its index field 304 and region field 308. If region field 308 indicates the virtual address is a global kernel address, a global signal is transmitted over communication path 144 which is connected to an enable input of exclusive-DR 404. The global signal disables exclusive-DR 404 and the hash address calculated for the current virtual address is solely determined by the bits in index field 304 of the current virtual address.

For either a kernel private address or a user address, though, exclusive-DR 404 combines the ASID received over communication path 148 with the index selected by multiplexer 400. Calculating the hash address as a function of the ASID and the virtual address ensures that identical virtual addresses for different processes are mapped to different TLB locations to decrease chances of thrashing.

As previously described, in response to a process' page size, multiplexer 400 selects one of seven sequentially ordered sets of bits from bits 12 to 30 from the current virtual address to be the index which is hashed by exclusive-DR 404 with the ASID. The process' page size is decoded from a status register (not shown), which stores the page size of the current user and the kernel, and input to the select input of multiplexer 400. For a 4K page size, multiplexer 400 selects bits 12 to 18; for an 8K page size, bits 13 to 19 are selected; for a 16K page size, bits 14 to 20 are selected; for a 64K page size, bits 16 to 22 are selected; for a 1M page size, it is bits 20 to 26; for a 4M page size, it is bits 22 to 28; and for a 16M page size, bits 24 to 30 are selected.

For non-global addresses, hashing means 404 creates a hash address into RAM 104 for the current virtual address and outputs the address to latch/decoder 408 during the operand fetch/address stage of the microprocessor. During the instruction execute stage, latch/decoder 408 decodes the 7-bit index and activates one of the 128 lines into RAM 104 so that the virtual address entries stored in memory sets 116, 120, and 124 of RAM 104 at the activated address can be read out.

B. COMPARING THE VIRTUAL TAGS

Once the address in RAM 104 that would store a translation of the current virtual address is calculated, virtual address identifier 200 for the entry in each memory set 116, 120, and 124 is compared by page address output circuit 112 to the current virtual address. A matching entry in one of the memory sets indicates the correct translation for the current virtual address is stored in RAM 104.

In making the comparison, each addressed virtual address identifier 200 is read out from RAM 104 and input to its corresponding individual compare/mask circuits 520, 522, or 524. For illustration purposes, a comparison operation will be described with reference to compare/mask circuit 520. Compare/mask circuits 522 and 524 function identically, and are therefore, not described.

Figure 3A:
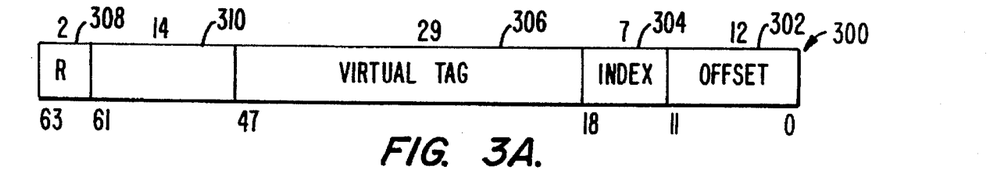
FIGS. 3(a)–(g) are diagrams of the virtual address fields for page sizes of 4K, 8K, 16K, 64K, 1M, 4M, and 16M bytes, respectively, which are supported by the translation lookaside buffer shown in FIG. 1.
Figure 3B:
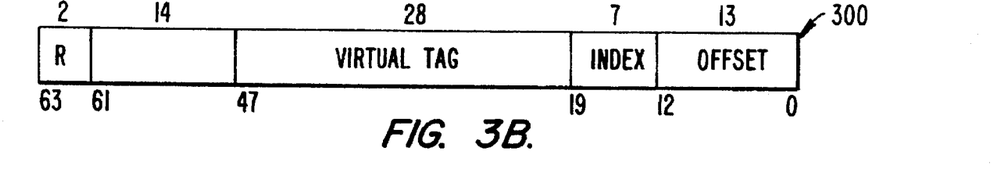
Figure 3C:
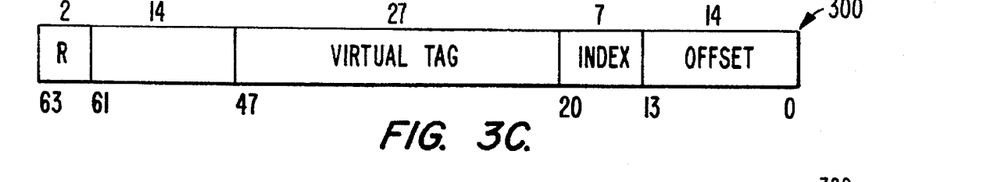
Figure 3D:
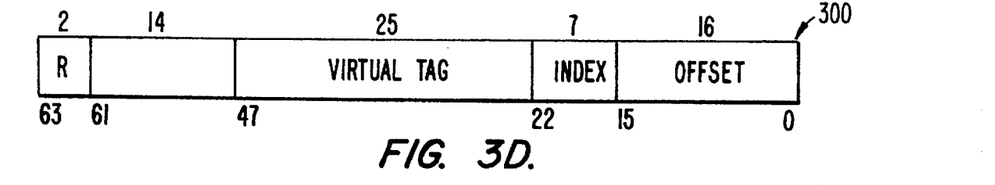
Figure 3E:
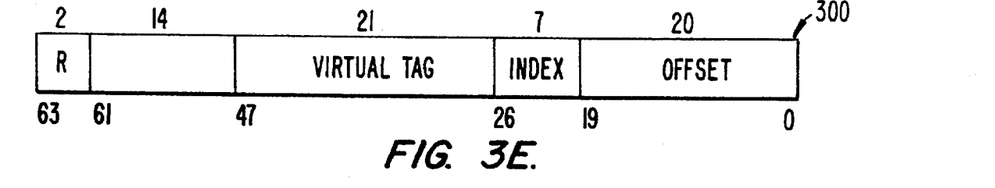
Figure 3F:
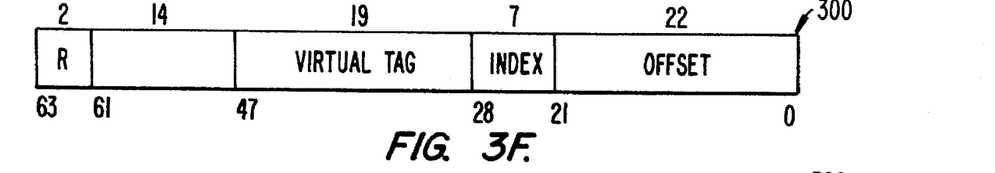
Figure 3G:
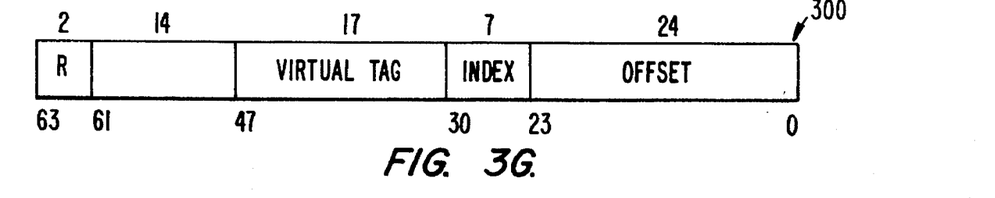

As previously discussed, the multiple page sizes supported by TLB 100 cause the size of virtual tag 204 to vary according to page size. Mask decoder 504 ensures that only comparisons of the appropriate bits are evaluated in determining if virtual address identifier 200 matches the current virtual address. In doing this, mask decoder 504 creates a mask based on the current process' page size and whether the current virtual address is a global or user-specific address. If the current virtual address is a global address, mask decoder 504 masks each bit of ASID field 202. Additionally, mask decoder 504 masks all bits in the virtual address outside the virtual tag field 306 of the appropriate page size. For example, as shown in FIG. 3(e), for a 1M byte page size, virtual tag 306 is only 19 bits long. Thus, mask decoder 504 masks the results of the comparison for all but the upper 19 bits of virtual tag 204.

Figure 6:
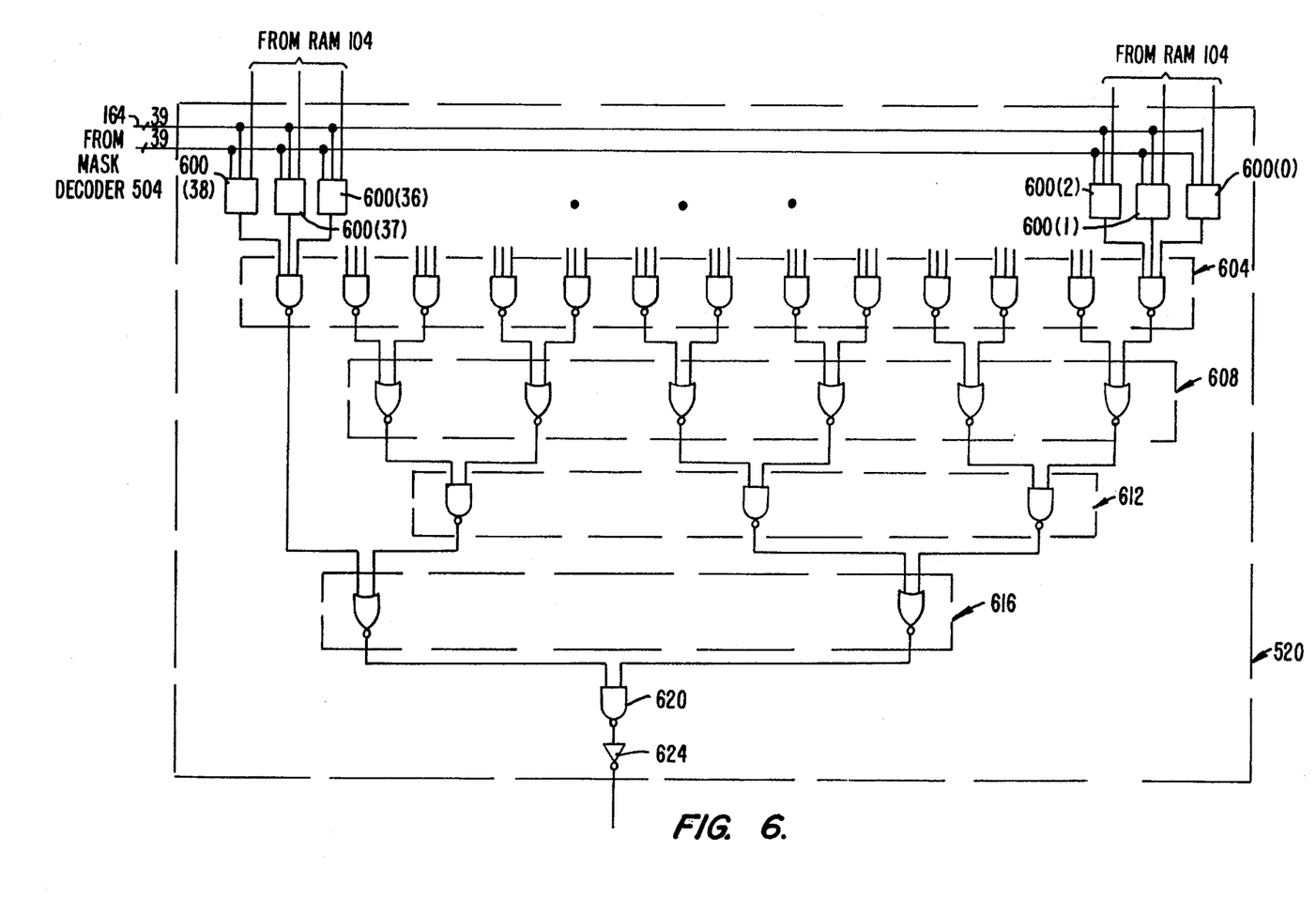
FIG. 6 is a block diagram of one embodiment of the compare and mask circuit shown in FIG. 5.

FIG. 6 is a block diagram of one embodiment of compare/mask circuit 520 shown in FIG. 5. Compare/mask circuits 522 and 524 are identical to compare and mask circuit 520 except the input signals are from their respective memory sets 120 and 124. Compare/mask circuit 520 includes logic circuits 600(0) . . . 600(38) (one for each bit line of ASID 202, virtual tag 204, and region bits 208 from memory set 116), NAND circuit 604, NOR circuit 608, NAND circuit 612, NOR circuit 616, NAND gate 620, and inverter 624.

Each individual logic circuit 600(i) receives a bit read out from memory set 116, a bit from the corresponding virtual address signal on communication path 164, and a corresponding one-bit mask signal from mask decoder 504. As described above, the one-bit mask signal determines if logic circuit 600(i) should compare the bit read out from memory set 116 to the corresponding bit from the current virtual address.

Figure 7:
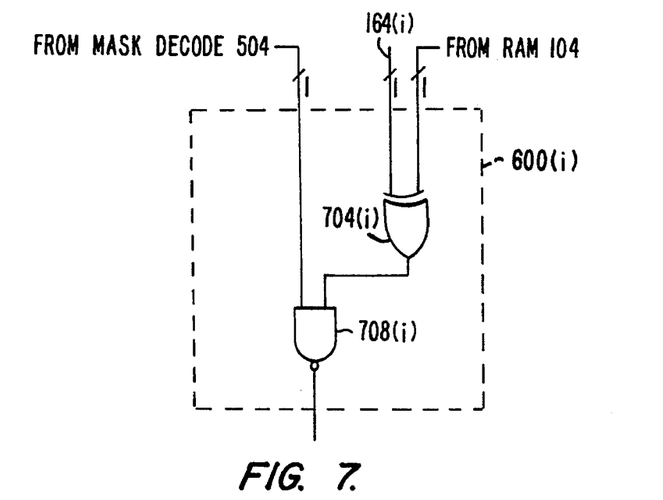
FIG. 7 is a diagram of one embodiment of an individual logic circuit shown in FIG. 6.

FIG. 7 is a diagram of one embodiment of an individual logic circuit 600(i) shown in FIG. 6. Each logic circuit 600(i) includes a two-input exclusive-OR gate 704(i) and a two input NAND gate 708(i). The one-bit mask signal is input directly to NAND gate 708(i). If the mask signal is low, then the output of NAND gate 708(i) is always high regardless of the output of exclusive-OR circuit 704(i). Thus, a low mask signal masks the comparison of the read out bit with the virtual address bit.

If the mask signal is high, the output of NAND gate 708(i) depends on the output of exclusive-OR gate 704(i). The two inputs to exclusive-OR gate 704(i) include the bit read out from memory set 116 and the corresponding bit from the current virtual address. When the bits input to exclusive-OR gate 704(i) do not match, the virtual address identifier stored in memory set 116 does not match the current virtual address, and the entry in memory set 116 of TLB 100 does not contain the translation for the current virtual address.

Additionally, when the bits do not match, the output of NAND gate 708(i) is dropped low. If the output of any single NAND gate 708(i) is low, the output of logic circuit 600(i) is low. When the output of a single logic circuit 600(i) is low, the output of the stage of NAND circuit 604 that logic circuit 600(*i*) is coupled to is high. A high output from a stage of NAND circuit 604 forces a low output from the corresponding stage of NOR circuit 608, which in turn, forces a high output from the corresponding stage of NAND circuit 612. A high output from NAND circuit 612 causes a low output from the corresponding stage of NOR circuit 616 and a high output from NAND gate 620. Finally, the high output of NAND gate 620 is forced low by inverter 624 to signify that the TLB entry from memory set 116 does not match the current virtual address.

If a match is not found in any of memory sets 116, 120, or 124, the signal sent out over communication path 160 is (000) indicating that a TLB miss has occurred and that no physical address translation exists for the current virtual address in TLB 100. When a TLB miss occurs, the page table for the process is consulted. If the page table indicates the virtual address is mapped to a physical page, the address of the physical page is given to the microprocessor and an exception handler for TLB 100 causes the virtual address and physical address mapping to be written into TLB 100. If the page table does not have a physical page entry for the virtual address, a new page is placed into physical memory, and an old page is swapped out if necessary to make room for the new page. TLB 100 is then updated with the address translation of the new page through a write operation.

When the bits input to exclusive-OR gate 704(*i*) match, there will be a low input to NAND gate 708(*i*) which will force NAND gate 708(*i*)'s output to be high. When the output of every NAND gate 708(0) . . . 708(38) is high because either the bits input to the respective exclusive-OR gates match or the respective masking bits are set low to mask the comparisons, the output of each stage of NAND circuit 604 is low. When the output of every stage of NAND circuit 604 is low, the output of all the stages of NOR circuit 608 is high, which forces the output of all the stages of NAND circuit 612 to be low. A low output from each stage of NAND circuit 612 causes a high output from NOR circuit 616, a low output from NAND gate 620, and a high output from inverter 624. When the output of inverter 624 is high, the output of compare and mask circuit 520 is high indicating that the virtual address identifier stored in memory set 116 matches the current virtual address and the physical page address identifier stored in the corresponding low section of memory set 116 is the physical page address identifier will be read out.

C. OUTPUTTING THE PHYSICAL PAGE ADDRESS

If one of stored virtual address identifiers 200 matches the current virtual address, page address output circuit 112 outputs physical page address identifier 210 that corresponds to the matching virtual address identifier through communication path 156.

Referring back to FIG. 5, multiplexer 512 in page address output circuit 112 determines which memory set the physical page address identifier is output from. Multiplexer 512 receives an output select signal input from the output of multiplexer 516. The output of multiplexer 516 is determined by the control signal received over communication path 176. For a virtual address translation, the control signal sets the output of multiplexer 516 to the 3-bit output of compare and mask circuit 500 instead of the memory set select signal received over communication path 172.

The 3-bit output select signal output from multiplexer 516 is set by compare and mask circuit 500. When the matching virtual address identifier is stored in memory set 116, the output of compare/mask circuit 520 is high and the output of compare/mask circuits 522 and 524 are low. Thus, the output select signal of (100) is sent to the select input of multiplexer 512. The physical page address identifier from memory set 116 is then output to communication path 156. An output select signal of (010) selects the physical page address identifier from memory set 120, and an output select signal of (001) selects the physical page address identifier from memory set 124.

If no matching virtual address identifier was found in RAM 104, the 3-bit select Signal of multiplexer 512 is (000) and no physical page address identifier is output.

III. WRITING AND READING TRANSLATION LOOKASIDE BUFFER 100

In addition to performing virtual address translations, TLB 100 can be written to and read from.

A. TLB WRITE OPERATIONS

Every time a TLB miss occurs for a virtual address translation, TLB 100 is updated by writing the missing translation to RAM 104. The missing virtual address is loaded into a virtual address register; the information to be loaded into the high portion of RAM 104, including the virtual tag, ASID, and region bits of the missing virtual address, is stored in a first register not shown; and the information to be loaded into the low portion of RAM 104, including the physical tag, is stored in a second register not shown.

A TLB replacement algorithm implemented in hardware randomly determines which memory set 116, 120, or 124 the new translation is stored in. After selecting which memory set will be used to store the new translation, the missing virtual address, which is stored in the virtual address register is then placed in the pipeline, and the TLB is addressed just like any other memory operation. That is, if the missing virtual address is in the global address space, hashing circuit 108 will not use the ASID in determining its index address into RAM 104, while if the address is a private address, its index will be a function of the ASID hashed with selected virtual address bits depending on the current page size.

The TLB replacement algorithm activates the write enable signal for the selected memory set and sends the signal to RAM 104 over communication path 130. The information stored in the first register is then written into the high portion of the selected memory set and information stored in the second register is written into the low portion of the selected memory set.

B. TLB READ OPERATIONS

In instances where a specific entry from a specific memory set in TLB 100 needs to be read out, e.g., for testing purposes, both the high and low portions of TLB 100 can be output. The address to be read out is placed in the virtual address register, which is not shown, and the virtual address is placed in the pipeline.

The TLB address is determined by hashing circuit 108 in the same manner as if a TLB translation or TLB write operation was occurring. The memory set of RAM 104 which is read from is indicated by the memory set select signal sent over communication path 172. The memory set select signal is input to multiplexer 508 and the addressed high entry from the memory set addressed by the memory set select signal is output onto communication path 152. The memory set select signal is also input to the select input of multiplexer 512 as selected by the control signal to multiplexer 516. The addressed low entry from the memory set addressed by the memory set select signal is then output onto communication path 156.

Having fully described one embodiment of the present invention, many other equivalent or alternative methods of implementing set associative TLB 100 will be apparent to those skilled in the art. For example, TLB 100 can comprise any number of sets of memory. A four-way set associative memory would increase TLBs storage capacity to 512 entries. TLB 100 can be implemented to support fewer or more than seven variable page sizes, and the sizes of individual pages supported by TLB 100 can be varied to almost any page size. Exclusive-OR 404 is not meant to be limited to an exclusive-OR circuit. Persons skilled in the art will recognize many different hashing circuits that can perform a similar function.

Additionally, compare/mask circuits 520, 522, and 524 can be implemented with many other variations of logic gates including hard-wired OR gates. Logic circuits 600(0). . 600(38) can also be made with different logic gates. The TLB replacement algorithm can be implemented in software, and rather than using a random replacement schedule, an algorithm such as the least recently used algorithm can be used. Furthermore, the index bits selected by multiplexer 400 do not need to be lowest seven bits which are sequentially ordered after the offset. The index bits can be any bits in the virtual address that are outside of the offset. These equivalents and other alternatives are intended to be included within the scope of the present invention.

What is claimed is:

1. A translation lookaside buffer for use in a processor that executes instructions from first and second processes, said first process addressing a first virtual memory space comprising a plurality of pages of a first page size and said second process addressing a second virtual memory space comprising a plurality of pages of a second page size, said translation lookaside buffer storing mappings of addresses in said first and second virtual memory spaces to a physical memory space and said translation lookaside buffer comprising:

a memory having a first memory space for storing a plurality of virtual address identifiers and a second memory space for storing a corresponding plurality of physical page identifiers;

indexing means, coupled to said memory, for creating an index address to a specific location in said first memory space for an input virtual address from a subset of bits of said input virtual address;

an index selection circuit, coupled to said indexing means, for selecting said subset to comprise a first subset of bits if said input virtual address is an address in said first virtual memory space and for selecting said subset of bits to comprise a second subset of bits different than said first subset if said input virtual address is an address in said second virtual memory space;

comparing means, coupled to said memory, for comparing a virtual address identifier stored in said first memory space at said index address with said input virtual address and for generating a match signal when said stored virtual address identifier matches said input virtual address, said comparing means comprising masking means for masking, with a first mask, comparisons of a first set of individual bits in said virtual address identifier to corresponding bits of said input virtual address when said input virtual address is an address in said first virtual address space and for masking, with a second mask, comparisons of a second set of individual bits in said virtual address identifier to corresponding bits of said input virtual address when said input virtual address is an address in said second virtual address space; and output means, coupled to said memory and to said comparing means, for outputting from said second memory space the physical page identifier corresponding to the matching stored virtual address identifier in response to said match signal.

2. The translation lookaside buffer of claim 1 wherein:

said memory is partitioned into a plurality of sets with exactly one entry in each set having an address equal to said index address; and wherein said comparing means is coupled to each set of said memory and compares a virtual address identifier from each memory set stored at said index address to said input virtual address.

3. The translation lookaside buffer of claim 1 wherein said comparing means further comprises a mask decoder for creating said first mask when said input virtual address is an address in said first virtual address space and for creating said second mask when said input virtual address is an address in said second virtual address space.

4. The translation lookaside buffer of claim 1 or 2 wherein said memory comprises a first memory for storing said virtual address identifiers in said first memory space and a second memory, coupled to said first memory, for storing said physical address identifiers in said second memory space.

5. A set associative translation lookaside buffer (TLB) for use in a processor that executes instructions from first and second processes, said first process having a first unique process identifier and addressing a first virtual memory space comprising a plurality of pages of a first page size, said second process having a second unique identifier and addressing a second virtual memory space comprising a plurality of pages of a second page size, wherein said first page size may be the same as said second page size, said set associative translation lookaside buffer storing mappings of addresses in said first and second virtual memory address spaces to a physical memory space, said set associative translation lookaside buffer comprising:

a memory comprising a plurality of memory sets, each memory set having a first memory space for storing virtual address identifiers and a second memory space for storing corresponding physical page identifiers;

a first register for storing one of said first and second page sizes;

a second register for storing one of said first and second process identifiers;

an index selection circuit for selecting for output a first and second subset of bits from an input virtual address in accordance with one of said first and second page sizes stored in said first register, said index selection circuit selecting said first subset of bits when said input virtual address is an address tier said first process and selecting said second subset of bits when said input virtual address is an address for said second process; and hashing means, coupled to said memory, to said index selection circuit, and to said second register, for hashing said first or second subset of bits with said process indentifier stored in said second register to create a randomized index to said TLB, wherein virtual address identifiers that have the same value but are generated by different processes, each process having a unique process indentifier, are stored in different storage locations in said TLB according to said unique process indentifier, thereby reducing thrashing.

6. A set associative translation lookaside buffer for use in a processor that executes instructions from first and second processes, said first process having a first unique process identifier and addressing a first virtual memory space comprising a plurality of pages of a first page size, said second process having a second unique identifier and addressing a second virtual memory space comprising a plurality of pages of a second page size, wherein said first page size may be the same as said second page size, said set associative translation lookaside buffer storing mappings of addresses in said first and second virtual memory address spaces to a physical memory space, said set associative translation lookaside buffer comprising:

- a memory comprising a plurality of memory sets, each memory set having a first memory space for storing virtual address identifiers and a second memory space for storing corresponding physical page identifiers;
- a first register for storing one of said first and second page sizes;
- a second register for storing one of said first and second process identifiers;
- an index selection circuit for selecting for output a first and second subset of bits from an input virtual address, said index selection circuit selecting said first subset of bits when said input virtual address is an address for said first process and selecting said second subset of bits when said input virtual address is an address for said second process; and
- hashing means, coupled to said memory, to said index selection circuit, and to said second register, for hashing said first or second subset of bits with said process identifier stored in said second register to create a randomized index address to said memory.

7. The set associative lookaside buffer of claim 6 further comprising:

- comparing means, coupled to said memory, for comparing a virtual address identifier stored in each of said memory sets at said index address to said input virtual address and for generating a match signal when one of said stored virtual address identifiers matches said input virtual address; and
- output means, coupled to said memory and said comparing means, for outputting the physical page identifier corresponding to said matching virtual address identifier in response to said match signal.

8. The set associative buffer claim 6, wherein said hashing means comprises an exclusive-OR circuit.

* * * * *